J. SCHUMACHER.
PLASTER BOARD AND METHOD OF MAKING SAME.
APPLICATION FILED DEC. 22, 1919.

1,352,390.

Patented Sept. 7, 1920
5 SHEETS—SHEET 1.

Inventor
John Schumacher
by Westall and Wallace
his Attorneys

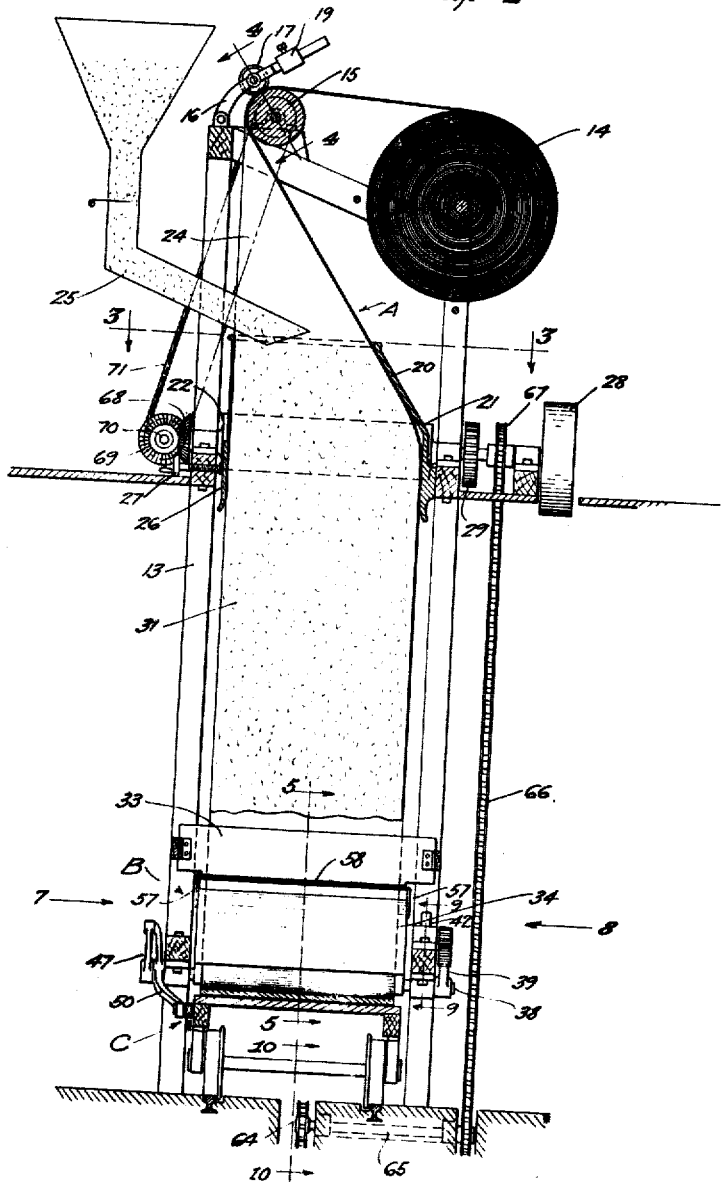

J. SCHUMACHER.
PLASTER BOARD AND METHOD OF MAKING SAME.
APPLICATION FILED DEC. 22, 1919.
1,352,390.
Patented Sept. 7, 1920.
5 SHEETS—SHEET 3.
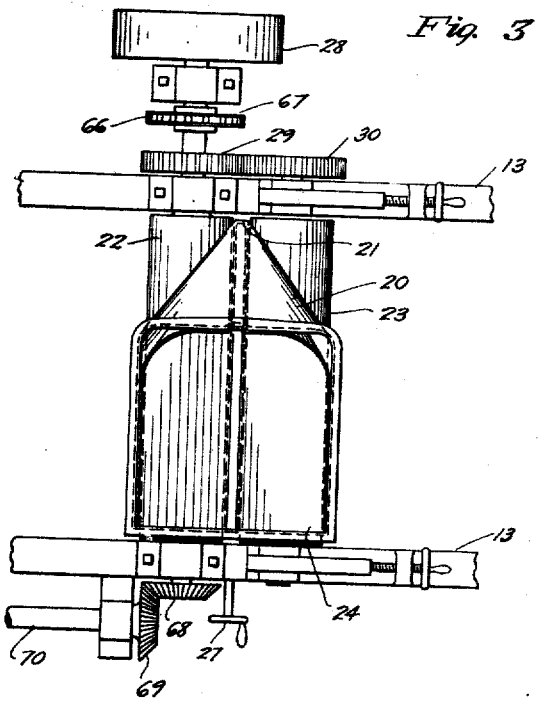
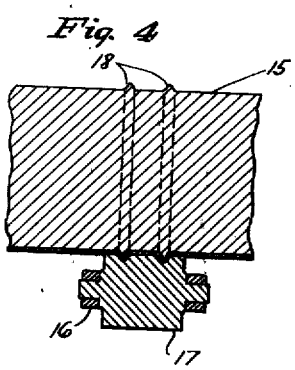
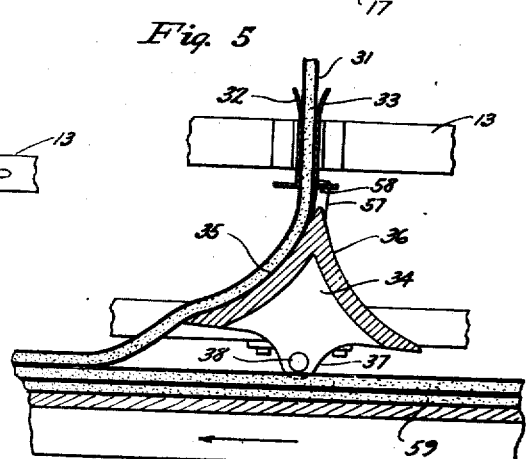
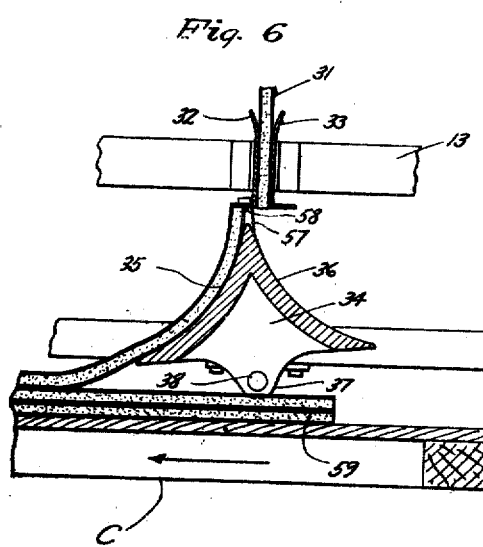
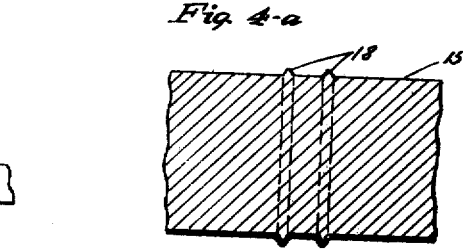
Inventor
John Schumacher
by Nestell and Wallace
his Attorneys J. SCHUMACHER.
PLASTER BOARD AND METHOD OF MAKING SAME.
APPLICATION FILED DEC. 22, 1919.
1,352,390.
Patented Sept. 7, 1920.
5 SHEETS—SHEET 4.
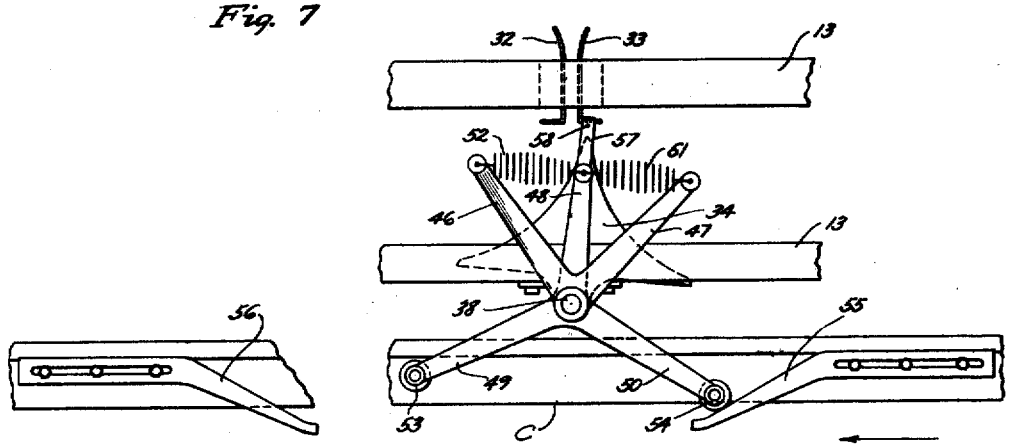
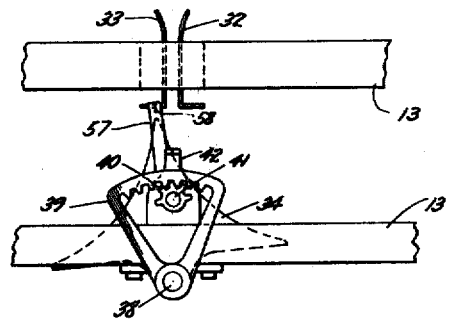
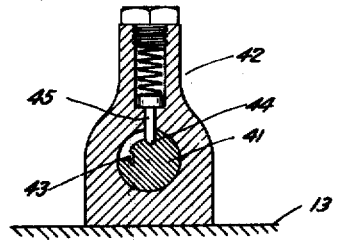
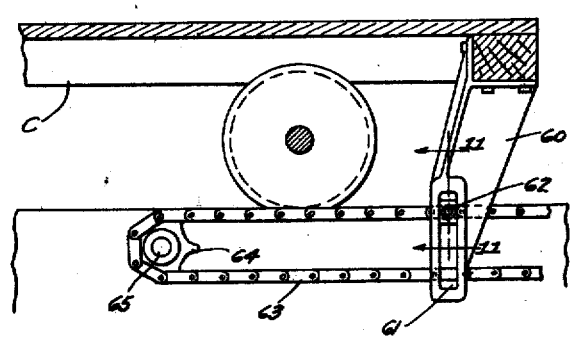
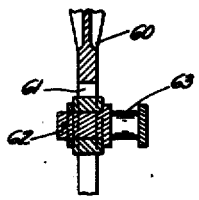
Inventor
John Schumacher
by Nestall and Wallace
his Attorneys

UNITED STATES PATENT OFFICE.

JOHN SCHUMACHER, OF LOS ANGELES, CALIFORNIA.

PLASTER-BOARD AND METHOD OF MAKING SAME.

1,352,390.  Specification of Letters Patent.  Patented Sept. 7, 1920.

Application filed December 22, 1919. Serial No. 346,534.

*To all whom it may concern:*

Be it known that I, JOHN SCHUMACHER, a citizen of the United States, residing at Los Angeles, in the county of Los Angeles and State of California, have invented new and useful Improvements in Plaster-Board and Methods of Making Same, of which the following is a specification.

This invention relates to an improved plaster board for building construction, and a method of producing the same. The invention pertains particularly to a board formed of plaster incased in a covering sheet.

It is an object of this invention to provide a substantial and durable plaster board, which will withstand the rough usage of handling. It is another object of this invention to provide an article of the character described, in which the plaster is incased in a single integral covering sheet. Processes have been heretofore employed in which plaster board has been made continuously by feeding two covering sheets and interposing therebetween plaster material. It is a still further object of this invention to provide a process, whereby a single flat covering sheet is continuously folded to form a top and bottom covering, and a plastic substance interposed therebetween.

I accomplish the above mentioned objects as well as other objects and corresponding accomplishments by means of the board illustrated in the accompanying drawings, and the means for carrying out the process for producing said board illustrated therein.

Figure 1:
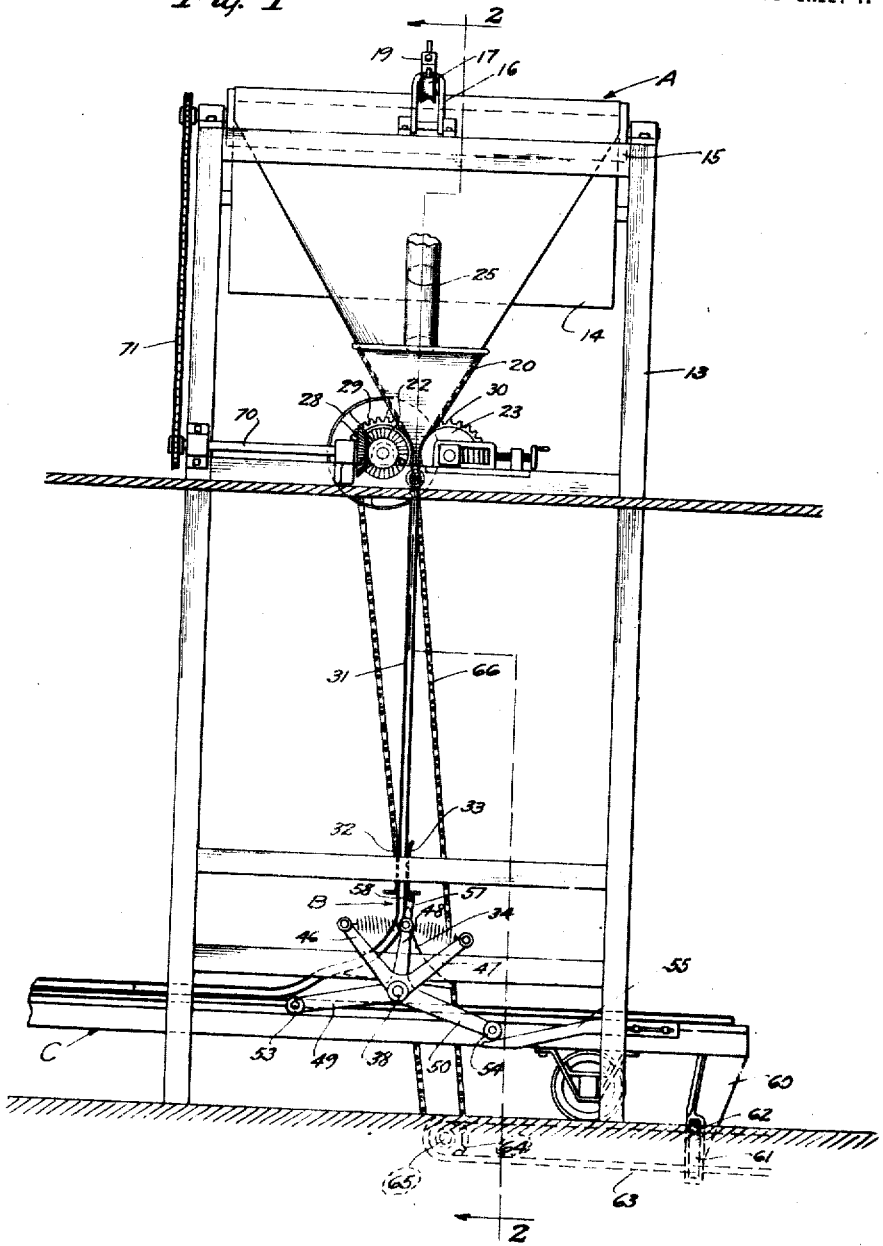
Figure 12:
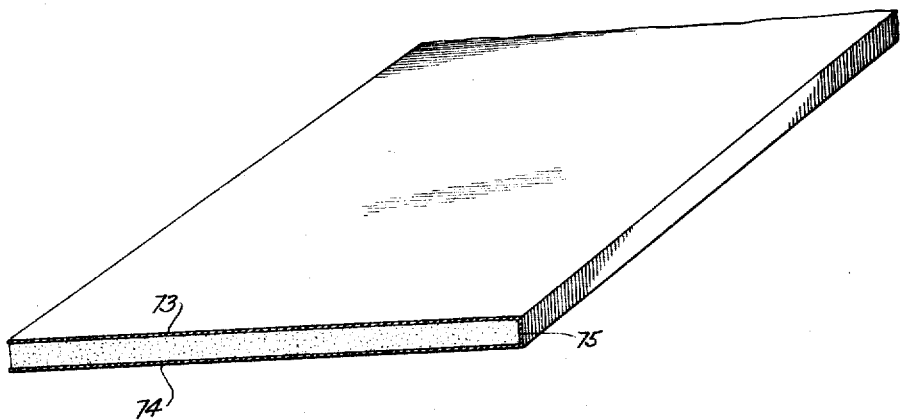

Figure 1 is a front elevation of a complete machine for forming plaster board, some of the supporting frame work not being shown in order to more clearly illustrate the invention; Fig. 2 is a section taken on the line 2—2 of Fig. 1; Fig. 3 is a section taken on the line 3—3 of Fig. 2; Fig. 4 is an enlarged section of the creasing roller taken on the line 4—4 of Fig. 2; Fig. 4ª is a section through a modified form of creasing roller; Fig. 5 is an enlarged section taken on the line 5—5 of Fig. 2 showing the switch and severing mechanism; Fig. 6 is a view similar to Fig. 5 showing the switch in another position; Fig. 7 is an enlarged side view of the switch as seen from one side indicated by the arrow 7 in Fig. 2; Fig. 8 is a view looking at the switch operating mechanism from the opposite side indicated by the arrow 8 in Fig. 2; Fig. 9 is a section through the detent lock on an enlarged scale, taken on the line 9—9 of Fig. 2; Fig. 10 is a vertical section through a portion of the cars for receiving the severed board illustrating a means of moving the same; Fig. 11 is an enlarged section on the line 11—11 of Fig. 10; and Fig. 12 is a perspective view of a portion of the finished board.

Referring more particularly to Figs. 1 and 2, a machine is shown in which the plaster board advances vertically from a hopper indicated generally by A. A switch and severing mechanism for cutting the board into lengths and piling it on the cars is indicated generally by B. Cars for receiving the severed board and mechanism for operating the same are indicated by C. These cars carry trays for receiving the plaster board as it emerges from the machine and is severed.

Referring more specifically to the hopper mechanism, a frame supporting the various parts of the machine is indicated by 13. A roll of paper used for the covering sheet is indicated by 14. The web of the roll is led over a creasing roller 15 journaled in the frame and downwardly to a folder later described. Pivotally mounted upon the frame adjacent the roller is a yoke 16, in which is journaled a creaser 17 for bearing on the paper. Referring particularly to Fig. 4 which shows a section through the creaser 17, annular ribs 18 are formed at the center of the creasing roller 15. The creaser 17 is resilient and rides on the top of the ribs, so that the paper is creased at the point where it will be folded. A weight 19 is mounted upon yoke 16 in such a manner that it may be adjusted and exerts pressure upon the creaser sufficient to properly crease the paper. Instead of the form of creasing mechanism just described, the form shown in Fig. 4ª may be used. In this form the creaser 17 and yoke are dispensed with and the tension of the paper bearing on the ribs is depended upon to crease. The web of paper is led downwardly from the roller 15 and into a folder 20, the creased portion of the paper advancing to the point 21 and between compression rollers 22 and 23. As the paper folds, a hopper is formed, into the opening 24 of which plaster is fed from a spout 25 in communication with the receptacle for the wet plaster composition. A guard 26 is placed on the exposed edge of the unfinished plaster board as it emerges from between the compression rollers and is adjusted as to position by means of a threaded shaft and hand wheel indicated by 27. The compression rollers 22 and 23 are positively driven, the shaft of compression roller 22 being extended and having a drive pulley 28 fixed thereon. A spur gear 29 is also fixed thereon and meshes with a spur gear 30 secured to the shaft of compression roller 23.

The unfinished board indicated by 31 passes vertically downward and is guided to cars, severed and deposited upon trays mounted upon the cars. The cars C are reciprocated so that the severed lengths of plaster board are piled thereon.

The unfinished plaster board passes between guides 32 and 33 mounted upon the frame work 13. As the board emerges from the guides, it is severed by a wire cutter. A tapering switch member 34 with the apex pointing upwardly has curved faces 35 and 36, as best shown in Figs. 5 and 6. Extensions 37 are formed on the base of the switch, and a shaft 38 fixed thereto. Secured to the shaft on one side is a segmental gear 39, see Figs. 1 and 8. This gear meshes with a pinion 40 mounted upon a shaft 41 secured to the frame. Engaging shaft 41 is a detent indicated generally by 42 and shown particularly in Fig. 9. The shaft has two recesses 43 and 44 formed in a peripheral groove, and mounted in the groove for engagement with the recesses is a spring pressed pin 45 tending to lock the shaft 41 and pinion 40 in positions at 90° to each other. By reason of the segmental gear 39, switch 34 is thus locked. The ratio of gears is such that the switch locks either in the position shown in Fig. 5 or that shown in Fig. 6. The switch is moved against the operation of the detent by the mechanism best shown in Figs. 1 and 7. Secured to shaft 38 are arms 46 and 47. Pivotally mounted upon shaft 38 is a member having three arms 48, 49, and 50. Secured between arm 48 and arm 47 is a tension spring 51, and secured between arm 48 and arm 46 is a tension spring 52. The three arm member is rocked by movement of the cars and snaps the switch 34 from one position to the other. When it is moved, it exerts spring tension upon the arm 48, until sufficient to overcome the resistance of the detent 42, whereupon the switch is moved. Mounted upon the ends of arms 49 and 50 are rollers 53 and 54, which are disposed to be engaged by inclined members disposed upon the ls of the cars. The inclined members are indicated by 55 and 56 and their inclination is toward one another. As the cars are reciprocated and the ends thereof approach the rollers on the arms 49 and 50, the latter will ride upon the inclines and rock the switch. Thus, in the position shown in Fig. 7, roller 54 is riding on incline 55, and will move the three arm member to rock the switch 34, so that its apex is on the other side of the central axis of the guide members 32 and 33. At the same instant that the switch is rocked, the board is severed. Mounted upon opposite end faces of the switch are arms 57, and strung between the arms is a severing wire 58. This wire is adapted to be passed through the board severing the same. Referring to Fig. 5, if the switch is rocked to the position shown in Fig. 6, the wire will sever the board, and the latter emerging from between the guides will move down over the face 36 of the switch and have the severed end laid upon the pile of boards indicated by 59 with the severed ends in registry. The reverse operation occurs as the other end of the cars approach the switch. The cars are moved at a speed corresponding to the speed of the advancing board.

Depending from the cars is a bracket 60 having a slot 61. Disposed in the slot is a pin 62 mounted upon an endless sprocket chain 63, best shown in Figs. 1 and 10. Sprocket chain 63 passes over a driving sprocket wheel 64 mounted upon a driving shaft 65 as shown in Fig. 2. The sprocket chain passes over an idle sprocket wheel at the other end of the travel of the cars. Secured to shaft 65 is a sprocket wheel over which passes a chain 66. Chain 66 passes over a sprocket wheel 67 mounted upon the shaft of compression roller 22.

Mounted upon the other end of the shaft of compression roller 22 is a bevel gear 68, which meshes with a bevel gear 69 fixed to a shaft 70. Mounted upon shaft 70 is a sprocket wheel over which a chain 71 is passed in gear with a sprocket wheel on the shaft of roller 15. Thus, roller 15 is positively driven at a speed corresponding to the other parts.

Paper is fed from the roll 14, is creased by the creaser 17, and folded by the compression rollers 22 and 23. Plaster material in its plastic state is fed from spout 25, and the unfinished board emerges from between the compression rollers as indicated by 31. While the board is advancing, cars C are reciprocated and the switch and severing mechanism operated. Initial lengths of board are cut and piled upon the trays on the cars.

The finished board is shown in Fig. 12. It comprises a single piece of covering material folded to form an upper covering 73 and a lower covering 74 with one edge of the plaster board covered as indicated by 75. The other edge is exposed. This provides a board having only one exposed edge, the other edge being straight and true, and requiring no trimming. The completed board has a smooth edge, a finished appearance, and cannot peel or tear at the edge 75.

While I have shown a specific means for carrying out my process, yet this is only one of various devices which may be used. My process is in no way limited to the particular machine shown.

What I claim is:

1. The method of making plaster board which consists in advancing a single sheet of covering material, folding said sheet intermediate the ends thereof to form parallel covers, and interposing plastic material between said covers.

2. The method of making plaster board which consists in advancing a single sheet of covering material, folding said sheet intermediate the ends thereof to form parallel covers, and flowing plastic material between said covers while the latter is being folded.

3. The method of making plaster board which consists in advancing a single sheet of covering material, folding said sheet intermediate the ends to form parallel covers, flowing plastic material between said covers while the latter is being folded, and compressing said board to form parallel faces.

4. The method of making plaster board which consists in advancing a single sheet of covering material, folding said sheet to form a hopper, and flowing plastic material into said hopper.

5. The method of making plaster board which consists in advancing a single sheet of covering material, folding said sheet to form a hopper, flowing plastic material into said hopper, and compressing said board to form parallel faces.

6. A plaster board comprising a single sheet of covering material folded to form parallel covers, and a plastic substance interposed between said covers and exposed at one side edge.

In witness that I claim the foregoing I have hereunto subscribed my name this 15th day of December, 1919.

JOHN SCHUMACHER.